United States Patent
Hennen

(10) Patent No.: US 10,432,126 B2
(45) Date of Patent: Oct. 1, 2019

(54) CONTROL DEVICE FOR AN ASYNCHRONOUS MACHINE AND METHOD FOR OPERATING AN ASYNCHRONOUS MACHINE

(71) Applicant: Robert Bosch GmbH, Stuttgart (DE)

(72) Inventor: Martin Hennen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/551,652

(22) PCT Filed: Jan. 13, 2016

(86) PCT No.: PCT/EP2016/050502
§ 371 (c)(1),
(2) Date: Aug. 17, 2017

(87) PCT Pub. No.: WO2016/134872
PCT Pub. Date: Sep. 1, 2016

(65) Prior Publication Data
US 2018/0026564 A1   Jan. 25, 2018

(30) Foreign Application Priority Data

Feb. 27, 2015   (DE) .................. 10 2015 203 524

(51) Int. Cl.
*G01H 3/00* (2006.01)
*H02P 6/10* (2006.01)
(Continued)

(52) U.S. Cl.
CPC ............... *H02P 23/08* (2013.01); *H02P 1/00* (2013.01); *H02P 27/06* (2013.01)

(58) Field of Classification Search
CPC .................... G01H 3/00; H02P 6/10
(Continued)

(56) References Cited

FOREIGN PATENT DOCUMENTS

CH          477124        8/1969
CN       85102382 A      10/1985
(Continued)

OTHER PUBLICATIONS

US 3,569,022 A, 03/1971, Domann et al. (withdrawn)
(Continued)

*Primary Examiner* — Bickey Dhakal
*Assistant Examiner* — Cortez M Cook
(74) *Attorney, Agent, or Firm* — Michael Best & Friedrich LLP

(57) ABSTRACT

The invention relates to a method for operating an asynchronous machine comprising the steps: determining an operating point trajectory for the asynchronous machine for a plurality of desired torques of the asynchronous machine by calculating 2-tuples from longitudinal current values and cross current values in a synchronously rotating coordinate system of the asynchronous machine; calculating a slip frequency of the asynchronous machine for each of the 2-tuples calculated from longitudinal current values and cross current values; determining a current rotor speed of the asynchronous machine; calculating an excitation frequency of the asynchronous machine by summation of the calculated slip frequency and the current rotor speed weighted with the number of pole pairs of the asynchronous machine; and comparing the calculated excitation frequency of the asynchronous machine with at least one predetermined resonance frequency value of the asynchronous machine. The determined operating point trajectory is thereby corrected by changing the ratio between longitudinal current value and cross current value at a constant desired torque for each of the 2-tuples for which the calculated excitation frequency corresponds to the at least one resonance frequency value.

11 Claims, 2 Drawing Sheets

(51) Int. Cl.
  *H02P 23/08* (2006.01)
  *H02P 1/00* (2006.01)
  *H02P 27/06* (2006.01)
(58) Field of Classification Search
  USPC .......................................... 318/128, 400.23
  See application file for complete search history.

(56) References Cited

FOREIGN PATENT DOCUMENTS

| CN | 88102930 | A | 11/1988 |
| CN | 1988368 | A | 6/2007 |
| JP | H05111291 | A | 4/1993 |
| JP | H05137390 | A | 6/1993 |
| JP | 2004187460 | | 7/2004 |
| JP | 2009225552 | A | 10/2009 |
| JP | 2011205857 | A | 10/2011 |

OTHER PUBLICATIONS

"Current Control of Induction Machines in the Field-Weakened Region", Gabriel Gallegos-Lopez et al. IEEE Transactions on Industry Applications, vol. 43, No. 4, Jul./Aug. 2007 (Year: 2007).*
Rik De Doncker, Duco W.J. Pulle, Andre Veltman, Advanced Electrical Drives Analysis, Modeling, Control ISSN 1612-1287 ISBN 978-94-007-0179-3 e-ISSN 1860-4676 e-ISBN 978-94-007-0181-6 DOI 10.1007/978-94-007-0181-6 Springer Dordrecht Heidelberg London New York (Advanced Electrical Drives Analysis) (Year: 2011).*
International Search Report for Application No. PCT/EP2016/050502 dated May 18, 2016 (English Translation, 1 page).
Gallegos-Lopez, G. et al., "Current Control of Induction Machines in the Field-Weakened Region", IEEE Transactions on Industry Applications, IEEE Service Center, Piscataway, NJ, US, vol. 43, No. 4, Jul. 1, 2007, pp. 981-989.

* cited by examiner

21 – DETERMINE WORKING POINT TRAJECTORY

22 – CALCULATE SLIP FREQUENCY

23 – ASCERTAIN PRESENT ROTOR SPEED

24 – CALCULATE EXCITATION FREQUENCY

25 – COMPARE CALCULATE EXCITATION FREQUENCY TO PREDETERMINED RESONANCE FREQUENCY

26 – CORRECT WORKING POINT TRAJECTORY

CONTROL DEVICE FOR AN ASYNCHRONOUS MACHINE AND METHOD FOR OPERATING AN ASYNCHRONOUS MACHINE

BACKGROUND OF THE INVENTION

The invention relates to a control device for an asynchronous machine and a method for operating an asynchronous machine.

Document CH 477 124 A discloses an arrangement for controlling the slip frequency in an asynchronous machine.

Electric drives having induction machines excite different frequencies in the three-phase machine depending on the operating point which has been determined on the basis of the speed and torque, which can cause solid-borne or airborne noise to be output and the ripple of the output torque to be influenced. Resonances of the machine and/or the components coupled thereto, which can adversely influence the emitted airborne noise of the electric drive, occur in particular during the excitation of characteristic frequencies of the three-phase machine, for example, via the transfer of forces in the air gap between the stator and the rotor, or in the case of characteristic frequencies of the components which are flange-mounted on the drive shaft of the machine.

In certain speed ranges, characteristic frequencies are excited within the components of the electric drive by harmonic components of the three-phase machine, and the level of the emitted airborne noise increases abruptly at these characteristic frequencies. The noises emitted by an electric drive should be reduced to a minimum during operation, however.

Thus there is a need for solutions for the operation of asynchronous machines, in which the noise development can be kept to a minimum across the entire operating range without the need to substantially limit the design of the machine and its power density.

SUMMARY OF THE INVENTION

The present invention provides, according to one first aspect, a method for operating an asynchronous machine, including the steps: determining a working point trajectory for the asynchronous machine for a plurality of desired torques of the asynchronous machine by calculating 2-tuples from longitudinal current values and cross current values in a synchronously rotating coordinate system of the asynchronous machine; calculating a slip frequency of the asynchronous machine for each of the 2-tuples calculated from longitudinal current values and cross current values; determining a present rotor speed of the asynchronous machine; calculating an excitation frequency of the asynchronous machine by summation of the calculated slip frequency and the present rotor speed weighted with the number of pole pairs of the asynchronous machine; and comparing the calculated excitation frequency of the asynchronous machine with at least one predetermined resonance frequency value of the asynchronous machine. The determined working point trajectory is thereby corrected by changing the ratio between longitudinal current value and cross current value at a constant desired torque for each of the 2-tuples for which the calculated excitation frequency corresponds to the at least one resonance frequency value.

According to one further aspect, the present invention provides a control device for an asynchronous machine, comprising a control module which is designed for determining a working point trajectory for the asynchronous machine for a plurality of desired torques of the asynchronous machine by calculating 2-tuples from longitudinal current values and cross current values in a synchronously rotating coordinate system of the asynchronous machine; calculating a slip frequency of the asynchronous machine for each of the 2-tuples calculated from longitudinal current values and cross current values; and calculating an excitation frequency of the asynchronous machine by summation of the calculated slip frequency and a present rotor speed weighted with the number of pole pairs of the asynchronous machine. The control device further includes a comparison module which is coupled to the control module and which is designed for comparing the excitation frequency of the asynchronous machine calculated by the control module with at least one predetermined resonance frequency value of the asynchronous machine, and correcting the working point trajectory determined by the control module by changing the ratio between longitudinal current value and cross current value at a constant desired torque for each of the 2-tuples for which the calculated excitation frequency corresponds to the at least one resonance frequency value.

According to one further aspect, the present invention provides an electric drive system comprising an asynchronous machine, an inverter which is coupled to the asynchronous machine and is designed for providing a polyphase current supply for the asynchronous machine, and comprising a control device according to the invention, which is coupled to the inverter and is designed for controlling the inverter according to the method according to the invention for operating an asynchronous machine.

One idea of the present invention is to shift the excited frequencies in an asynchronous machine with the aid of a control algorithm in such a way that characteristic frequencies and/or resonance frequencies in the electric drive system are no longer excited. This can be ensured by varying the slip frequency, as an additional controlled variable for determining the operating point or working point of the asynchronous machine, via the ratio between longitudinal current and cross current at a predefined desired torque.

The design criterion according to which the requirements on the acoustics must be met across the entire frequency spectrum and in virtually all speed ranges is thereby loosened up considerably. The loudness differences in the airborne noise emitted by the asynchronous machine are substantially reduced by preventing the excitation of resonance frequencies of the asynchronous machine.

Although the variation of the working point trajectory comes at a cost of the efficiency of the asynchronous machine, it is not necessary to permanently correct the working point away from the working point of the asynchronous machine, which is optimal in terms of efficiency aspects. The procedure according to the invention therefore results in one additional degree of freedom in the control of the asynchronous machine, which allows for a dynamic and temporary control mechanism for preventing the excitation of precisely these characteristic frequencies at load points, at which undesired characteristic frequencies of the drive system would be excited.

According to one embodiment of the method according to the invention, the determination of the working point trajectory can include minimizing the phase current for each of the plurality of desired torques of the asynchronous machine, which is obtained by vector addition of the longitudinal current and the cross current.

According to one further embodiment of the method according to the invention, the at least one predetermined resonance frequency value of the asynchronous machine can include a characteristic frequency in a gearbox connected to the asynchronous machine, a resonance frequency excited by air-gap forces in the asynchronous machine, and/or the harmonic components thereof.

In one further embodiment, the predetermined resonance frequency values of the asynchronous machine can be determined by means of speed-dependent measurements of airborne noise.

According to one further embodiment of the method according to the invention, the change in the ratio between longitudinal current value and cross current value can include an increase in the phase current, which is obtained by vector addition of the longitudinal current and the cross current, at a constant desired torque.

According to one embodiment of the control device according to the invention, the control device can also include a speed detection module which is coupled to the control module and which is designed for detecting the present rotor speed of the asynchronous machine.

According to one further embodiment of the control device according to the invention, the control device can also include a reference value memory which is coupled to the comparison module and which is designed for storing predetermined resonance frequency values of the asynchronous machine.

According to one further embodiment of the control device according to the invention, the predetermined resonance frequency values can include a characteristic frequency in a gearbox connected to the asynchronous machine, a resonance frequency excited by air-gap forces in the asynchronous machine, and/or the harmonic components thereof.

According to one further embodiment of the control device according to the invention, the control module can be designed for determining the working point trajectory for the asynchronous machine by minimizing the phase current, which is obtained by vector addition of the longitudinal current and the cross current, for each of the plurality of desired torques of the asynchronous machine.

BRIEF DESCRIPTION OF THE DRAWINGS

Further features and advantages of embodiments of the invention result from the following description with reference to the attached drawings.

In the drawings.

DETAILED DESCRIPTION

In the operation of an asynchronous machine as a motor, there is a difference between the speed ns of the stator and the actual speed nr, i.e., the actual speed of the rotor, and so the actual speed of the rotor is less than the speed of the stator. The difference is also referred to as slip—the corresponding slip frequency fs must therefore be added to the rotor frequency fr=p·nr, which is dependent on the number of pole pairs p of the asynchronous machine, in order to calculate the stator frequency fst:

$$fst = p \cdot nr + fs$$

In the field-oriented closed-loop control of an asynchronous machine, in which the currents through the stator of the asynchronous machine are controlled according to a field-oriented coordinate system having a so-called longitudinal axis d and a quadrature axis q which extends orthogonal to the longitudinal axis, the d-axis therefore always lies in the direction of the space vector of the rotor flux. The space vector of the stator current is therefore composed of a longitudinal current component Id and a cross current component Iq in the field-oriented coordinate system.

The slip frequency fs is not constant in the entire operating range of the asynchronous machine, but rather is proportional depending on a slip factor factor ks which, in turn, is proportional to the longitudinal component of the stator current (the longitudinal current component Id) and to the quadrature axis component of the stator current (the cross current component Iq). In the field-oriented control, in order to optimize the efficiency, the ratio between longitudinal component of the stator current and quadrature axis component of the stator current can be adjusted in such a way that a minimal phase current results at a constant desired torque. The phase current has an absolute value in this case, which results from the absolute value of the vector addition of longitudinal component and quadrature axis component. Therefore, one working point having a maximum torque per phase current (MTPC) results for each desired torque and each rotor speed. These working points result, in dependence on the desired torque and the rotor speed, in a working point trajectory, according to which the operation of the asynchronous machine can be controlled.

By transforming the longitudinal component and the quadrature axis component of the stator current from the field-oriented coordinate system into a stator-oriented coordinate system of the asynchronous machine, control signals result for the desired working points, for an n-phase, for example, 3-phase inverter supplying the asynchronous machine.

Figure 1:
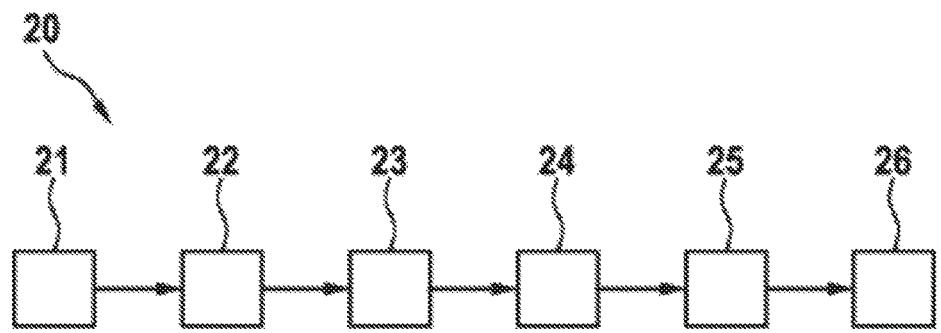
FIG. 1 shows a schematic representation of one method for controlling an asynchronous machine according to one embodiment of the invention.

FIG. 1 shows a schematic representation of a method 20 for controlling an asynchronous machine. The method 20 can be implemented, for example, in a control device for an inverter supplying the asynchronous machine, for example, in the control device 2 for the electric drive system 10 from FIG. 2, the control device being explained further below in association with FIG. 3.

Initially, in a first step 21, a working point trajectory for the asynchronous machine is determined for a plurality of desired torques of the asynchronous machine. This takes place by calculating 2-tuples from longitudinal current values and cross current values in a synchronously rotating coordinate system of the asynchronous machine. The 2-tuples can be determined, for example with consideration for an optimal efficiency of the asynchronous machine, in which vector addition is applied to the longitudinal current and the cross current, and the absolute value of the resultant phase current is minimized. As a result, a 2-tuple assigned to a particular working point can be determined for each of the plurality of desired torques of the asynchronous machine, wherein the 2-tuples, in combination, form the working point trajectory.

The slip frequency of the asynchronous machine is then calculated for each of the 2-tuples calculated from longitudinal current values and cross current values, in step 22. In general, if the ratio between longitudinal current value and corresponding cross current value increases (while the desired torque remains the same), the slip frequency decreases. For example, for a desired torque of 60 Nm of an exemplary asynchronous machine which is operated with a longitudinal current value of 40 A and a cross current value of 450 A, the slip frequency can amount to approximately 18 Hz. However, the slip frequency can decrease to less than 3 Hz if the longitudinal current value is increased to 200 A and the cross current value is reduced to 189 A.

As indicated above, the slip frequency influences the frequency of the excitations transferred to the asynchronous machine. In order to calculate the excitations which are actually transferred to the asynchronous machine, it is also necessary to know the number of pole pairs of the asynchronous machine and the present rotor speed. In one step 23 of the method 20, this present rotor speed of the asynchronous machine can be ascertained, for example, via a speed sensor, an encoder, or a suitable sensorless measuring method. Next, in step 24, an excitation frequency of the asynchronous machine can be calculated by summation of the calculated slip frequency and the present rotor speed weighted with the number of pole pairs of the asynchronous machine.

If all excited fundamental and harmonic waves of the asynchronous machine and the drive components connected to the shaft are now known, it can be predicted whether and to what extent characteristic frequencies of the electric drive system will be excited at the calculated excitation frequency. The resonance frequency values of the asynchronous machine can include, for example, characteristic frequencies in a gearbox connected to the asynchronous machine, a resonance frequency excited by air-gap forces in the asynchronous machine, and/or the hamonic components thereof. Such resonance frequency values of the asynchronous machine can be measured, for example, by means of speed-dependent measurements of airborne noise.

In order to make it possible to prevent the excitation of specifically these characteristic frequencies, the calculated excitation of the asynchronous machine is compared with at least one predetermined resonance frequency value of the asynchronous machine in step 25 of the method 20. If it is determined that the calculated excitation frequency corresponds to the at least one resonance frequency value, the determined working point trajectory is corrected for this excitation frequency, in a step 26, by changing the ratio between longitudinal current value and cross current value. The desired torque is thereby held constant. The 2-tuples can be changed in such a way, for example, that the change in the ratio between longitudinal current value and cross current value includes an increase in the phase current, which is obtained by vector addition of the longitudinal current and the cross current, at a constant desired torque.

Due to the change in the ratio between longitudinal current value and cross current value, a change in the slip frequency can be achieved, and so the excitation frequency of the asynchronous machine no longer coincides with the critical resonance frequency value at the particular rotor speed and the predetermined desired torque. In other words, the working point trajectory is deliberately varied at the cost of certain drops in efficiency, in order to always keep the excitation frequencies, which are transferred to the asynchronous machine, outside of the range of the characteristic frequencies of the electric drive system.

This acoustic optimization of the working point trajectory does not need to take place permanently, but rather can be maintained only temporarily in the particular speed range of the critical resonance frequency values, and so the negative influence on the efficiency of the asynchronous machine, averaged over time, is negligible.

The method 20 is particularly helpful in the base speed range of electric drive systems, in which a sufficient control reserve is present during the variation of the ratio between longitudinal current value and cross current value. From an acoustic perspective, the most critical operating points lie in the base speed range, however, since, at higher speeds, secondary noises of other system components or driving noises from vehicles mostly mask the noises of the asynchronous machine. By means of the present method, the noise level at the critical resonance frequency values can be reduced to 5 dB for exemplary asynchronous machines.

Figure 2:
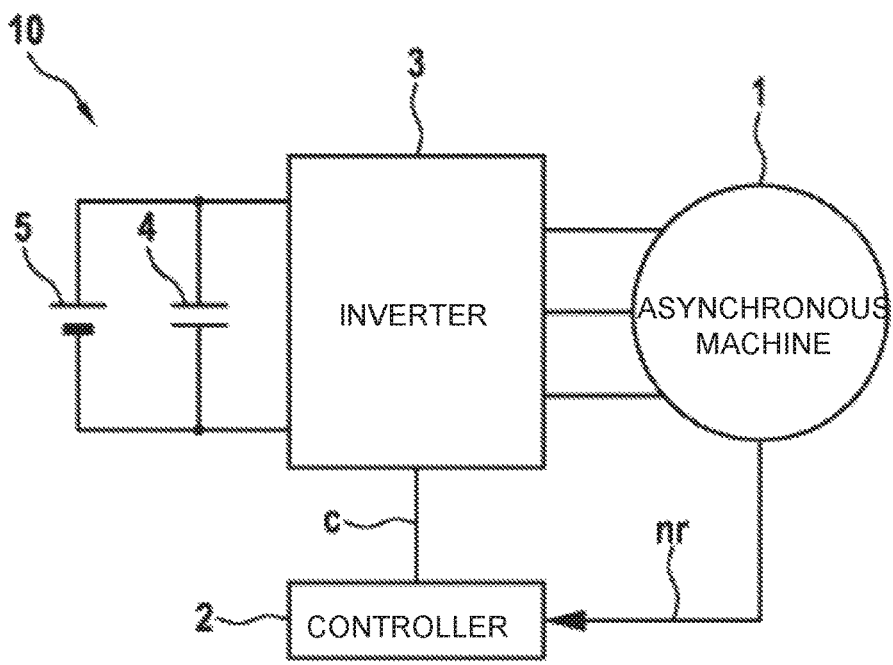
FIG. 2 shows a schematic representation of an electric drive system comprising an asynchronous machine according to one further embodiment of the invention.
Figure 3:
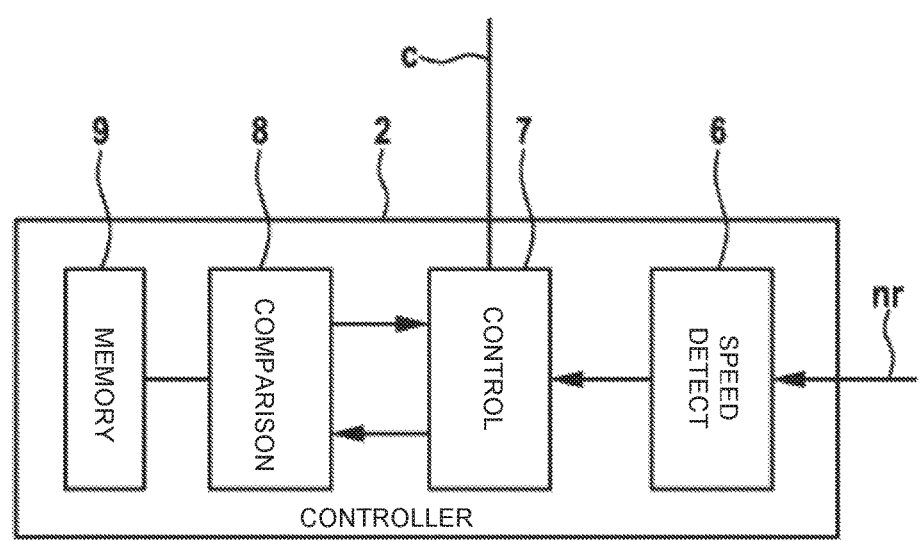
FIG. 3 shows a schematic representation of a control device for an asynchronous machine according to one further embodiment of the invention.

FIG. 2 shows a schematic representation of an electric drive system 10 comprising an asynchronous machine 1 which is supplied with an n-phase polyphase current by an inverter 3. The inverter 3 can be supplied with energy, for example, from a DC voltage source 5, such as a traction battery of a vehicle, the DC voltage source being supported by a DC voltage intermediate circuit 4.

The electric drive system 10 comprises a control device 2 which is coupled to the inverter 3 and which is designed for controlling the inverter 3 according to the method 20 as explained in association with FIG. 1 for operating the asynchronous machine 1. The control device 2 is shown in greater detail in the schematic representation in FIG. 3.

The control device 2 includes a speed detection module 6 which is coupled to a control module 7. The control module 7 of the control device 2, in turn, is coupled to a comparison module 8 which has access to a reference value memory 9. The speed detection module 6 is coupled to the asynchronous machine 1 and is designed for detecting the present rotor speed nr of the asynchronous machine 1.

The present rotor speed is forwarded to the control module 7 which is designed for determining a working point trajectory for the asynchronous machine 1 for a plurality of desired torques of the asynchronous machine 1 by calculating 2-tuples from longitudinal current values and cross current values in a synchronously rotating coordinate system of the asynchronous machine 1. For each of the 2-tuples calculated from longitudinal current values and cross current values, the control module 7 then calculates a slip frequency of the asynchronous machine 1. On the basis of the slip frequency of the asynchronous machine 1, the control module 7 can calculate an excitation frequency of the asynchronous machine 1. This takes place in the control module 7 by summation of the calculated slip frequency and the present rotor speed nr weighted with the number of pole pairs of the asynchronous machine 1. The working point trajectory for the asynchronous machine 1 can be determined, for example, by minimizing the phase current, which is obtained by vector addition of the longitudinal current and the cross current, for each of the plurality of desired torques of the asynchronous machine 1.

The determined working point trajectory is then output to the comparison module 8 coupled to the control module 7. The comparison module 8 is designed for comparing the excitation frequency of the asynchronous machine 1, which is calculated by the control module 7, with at least one predetermined resonance frequency value of the asynchronous machine 1. For each of the 2-tuples for which the calculated excitation frequency corresponds to the at least one resonance frequency value, the comparison module 8 can then correct the working point trajectory determined by the control module 7. This takes place by changing the ratio between longitudinal current value and cross current value at a constant desired torque.

The comparison module 8 can obtain the resonance frequency values from the reference value memory 9, for example. Predetermined resonance frequency values of the asynchronous machine 1, for example, a characteristic frequency in a gearbox connected to the asynchronous machine 1, a resonance frequency excited by air-gap forces in the asynchronous machine 1, and/or the harmonic components thereof, can be stored in the reference value memory 9. These resonance frequency values can have been measured in advance, for example, by means of measurements of airborne noise in different speed ranges.

The working point trajectory, which has been corrected by the comparison module 8, if necessary, is then transmitted back to the control module 7, and so the control module 7 can control the inverter 3 using a corresponding control signal c.

The control device 2 can be utilized, for example, in an electric drive system 10 for electric and hybrid vehicles which access an asynchronous machine 1 and are subject to corresponding requirements with respect to maximum loudness level in all speed ranges.

The invention claimed is:

1. A method (20) for operating an asynchronous machine (1), the step the method comprising:
   determining (21) a working point trajectory for the asynchronous machine (1) for a plurality of desired torques of the asynchronous machine (1) by calculating 2-tuples from longitudinal current values and cross current values in a synchronously rotating coordinate system of the asynchronous machine (1);
   calculating (22) a slip frequency of the asynchronous machine (1) for each of the 2-tuples calculated from longitudinal current values and cross current values;
   determining (23) a present rotor speed of the asynchronous machine (1);
   calculating (24) an excitation frequency of the asynchronous machine (1) by summation of the calculated slip frequency and the present rotor speed weighted with the number of pole pairs of the asynchronous machine (1);
   comparing (25) the calculated excitation frequency of the asynchronous machine (1) with at least one predetermined resonance frequency value of the asynchronous machine (1); and
   correcting (26) the determined working point trajectory by changing the ratio between longitudinal current value and cross current value at a constant desired torque for each of the 2-tuples for which the calculated excitation frequency corresponds to the at least one resonance frequency value.

2. The method (20) as claimed in claim 1, wherein the determination (21) of the working point trajectory includes:
   minimizing the phase current, which is obtained by vector addition of the longitudinal current and the cross current, for each of the plurality of desired torques of the asynchronous machine (1).

3. The method (20) as claimed in claim 1 wherein the at least one predetermined resonance frequency value of the asynchronous machine (1) includes a characteristic frequency in a gearbox connected to the asynchronous machine (1), a resonance frequency excited by air-gap forces in the asynchronous machine (1), and/or the harmonic components thereof.

4. The method (20) as claimed in claim 3, wherein the predetermined resonance frequency values of the asynchronous machine (1) are determined using speed-dependent measurements of airborne noise.

5. The method (20) as claimed in claim 1, wherein the change in the ratio between longitudinal current value and cross current value includes an increase in the phase current, which is obtained by vector addition of the longitudinal current and the cross current, at a constant desired torque.

6. An electric drive system (10), comprising:
   an asynchronous machine (1);
   an inverter (3) coupled to the asynchronous machine (1) and configured to provide a polyphase current supply for the asynchronous machine (1); and
   a control device (2) configured to determine a working point trajectory for the asynchronous machine (1) for a plurality of desired torques of the asynchronous machine (1) by calculating 2-tuples from longitudinal current values and cross current values in a synchronously rotating coordinate system of the asynchronous machine (1), calculating a slip frequency of the asynchronous machine (1) for each of the 2-tuples calculated from longitudinal current values and cross current values, and calculating an excitation frequency of the asynchronous machine (1) by summation of the calculated slip frequency and a present rotor speed weighted with the number of pole pairs of the asynchronous machine (1), and the control device (2) configured to compare the excitation frequency of the asynchronous machine (1) with at least one predetermined resonance frequency value of the asynchronous machine (1), and correcting the working point trajectory by changing the ratio between longitudinal current value and cross current value at a constant desired torque for each of the 2-tuples for which the calculated excitation frequency corresponds to the at least one resonance frequency value;
   the control device coupled to the inverter (3) configured to control the inverter (3) according to the method as claimed in claim 1 for operating the asynchronous machine (1).

7. A control device (2) for an asynchronous machine (1), configured to:
   determine a working point trajectory for the asynchronous machine (1) for a plurality of desired torques of the asynchronous machine (1) by calculating 2-tuples from longitudinal current values and cross current values in a synchronously rotating coordinate system of the asynchronous machine (1), calculating a slip frequency of the asynchronous machine (1) for each of the 2-tuples calculated from longitudinal current values and cross current values, and calculating an excitation frequency of the asynchronous machine (1) by summation of the calculated slip frequency and a present rotor speed weighted with the number of pole pairs of the asynchronous machine (1); and
   to compare the excitation frequency of the asynchronous machine (1) with at least one predetermined resonance frequency value of the asynchronous machine (1), and correcting the working point trajectory by changing the ratio between longitudinal current value and cross current value at a constant desired torque for each of the 2-tuples for which the calculated excitation frequency corresponds to the at least one resonance frequency value.

8. The control device (2) as claimed in claim 7, further comprising:
   a speed detection module (6) configured to detect the present rotor speed of the asynchronous machine (1).

9. The control device (2) as claimed in claim 7, further comprising:

a reference value memory (9) configured to store predetermined reference frequency values of the asynchronous machine (1).

10. The control device (2) as claimed in claim 9, wherein the predetermined resonance frequency values include a characteristic frequency in a gearbox connected to the asynchronous machine (1), a resonance frequency excited by air-gap forces in the asynchronous machine (1), and/or the harmonic components thereof.

11. The control device (2) as claimed in claim 7, wherein the control control device (2) is further configured to determine the working point trajectory for the asynchronous machine (1) by minimizing the phase current, which is obtained by vector addition of the longitudinal current and the cross current, for each of the plurality of desired torques of the asynchronous machine (1).

\* \* \* \* \*